United States Patent [19]
Koziol

[11] 3,806,987
[45] Apr. 30, 1974

[54] BARBECUE HINGE STRUCTURE

[76] Inventor: Walter Koziol, Box 97, Russell, Ill. 60075

[22] Filed: May 8, 1972

[21] Appl. No.: 251,242

[52] U.S. Cl. .................................. 16/191, 126/25
[51] Int. Cl. ............................................ E05d 11/06
[58] Field of Search ............... 16/191, 190; 126/25; 220/31

[56] References Cited
UNITED STATES PATENTS

| | | | |
|---|---|---|---|
| 3,605,718 | 9/1971 | Winters | 126/25 |
| 3,567,065 | 3/1971 | Dinse | 126/25 |
| 2,347,980 | 5/1944 | Apfelbaum | 16/191 |
| 2,402,327 | 6/1946 | Harrington | 16/191 |
| 2,794,208 | 6/1957 | Scroggins | 16/191 |

Primary Examiner—Bobby R. Gay
Assistant Examiner—Doris L. Troutman
Attorney, Agent, or Firm—Neil E. Hamilton

[57] ABSTRACT

A hinge structure for a barbecue grill which affords positive holding between the base and cover. The cover has extending flanges with end engaging portions to abut against the rear wall of the base and the base has stop members spaced from the rear wall of the base to engage the cover when the cover is in an open position. A flange interconnects the base stop member and serves as a bearing surface for the cover with an undercut portion of the stop providing a retention feature for a ledge on the cover.

10 Claims, 8 Drawing Figures

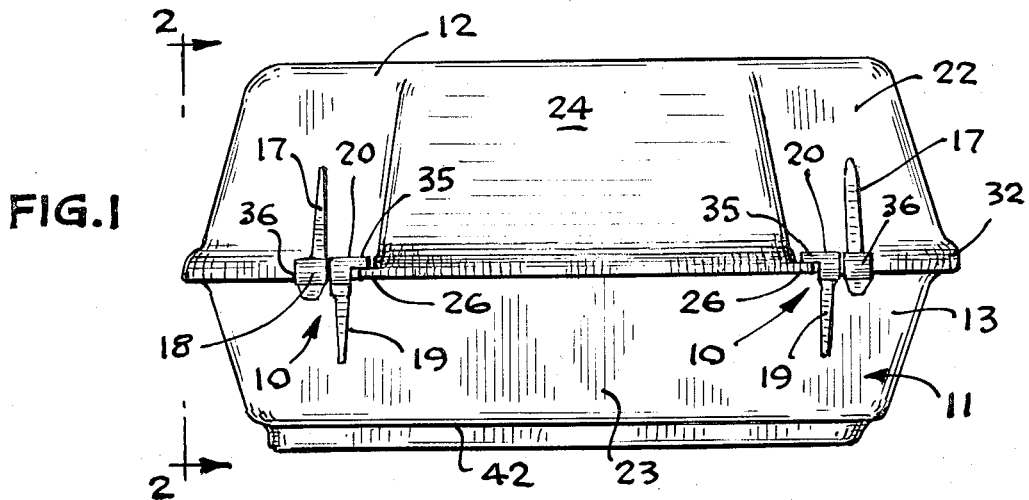
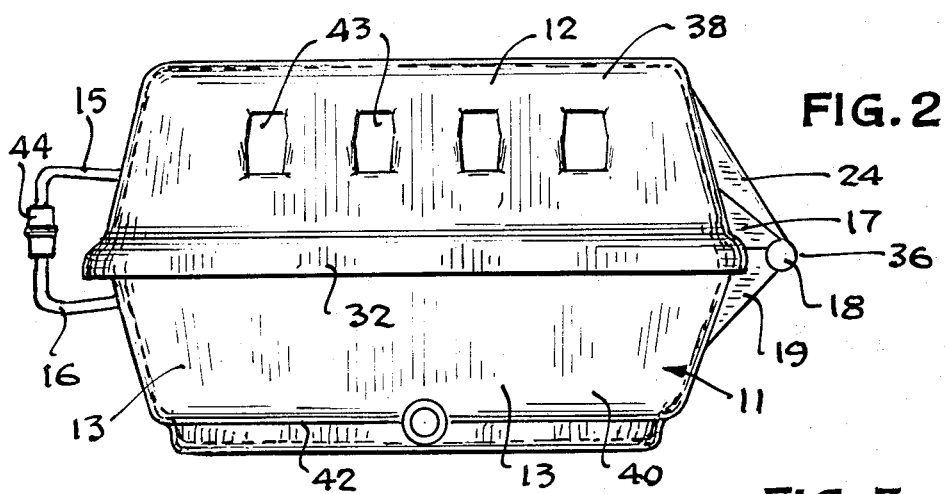
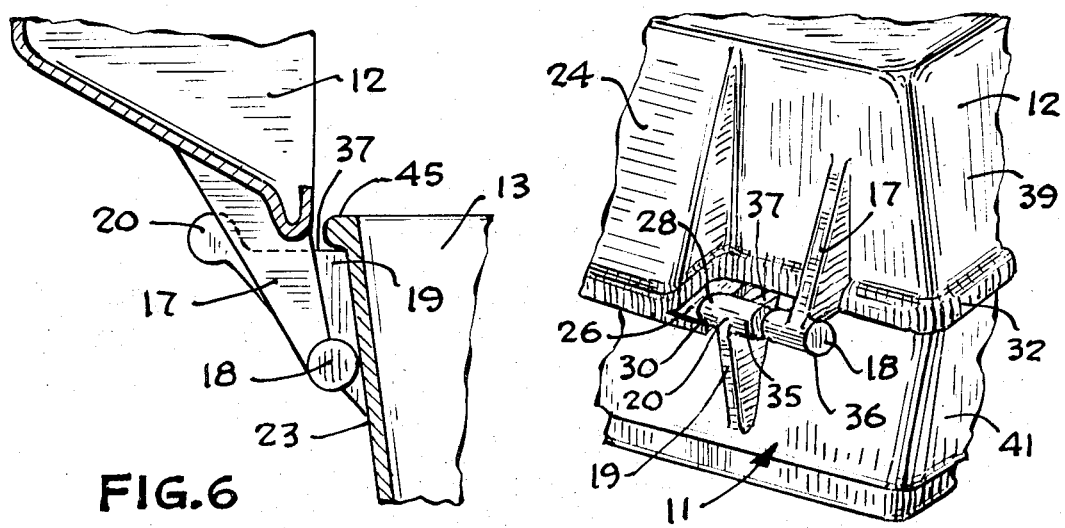

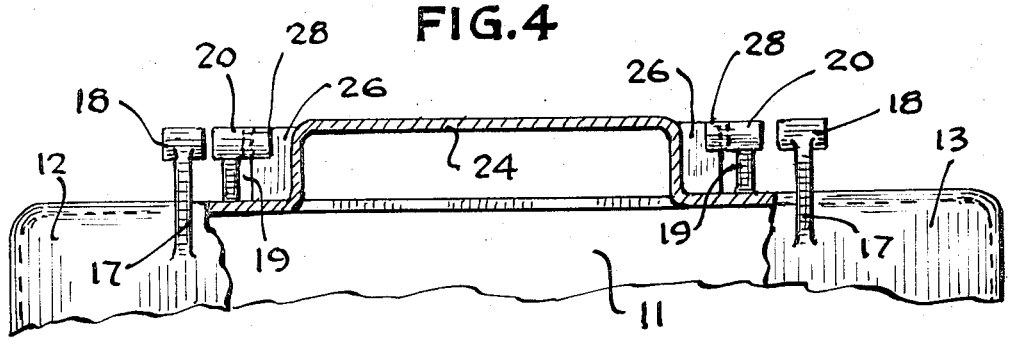
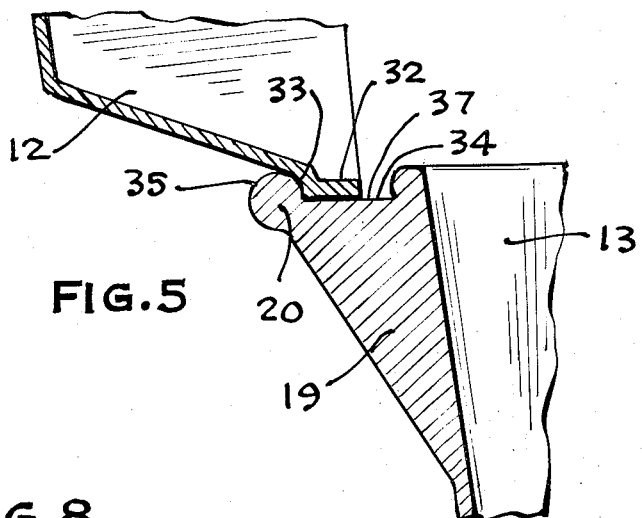
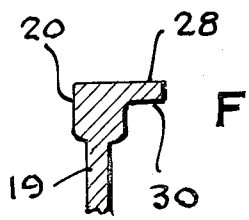
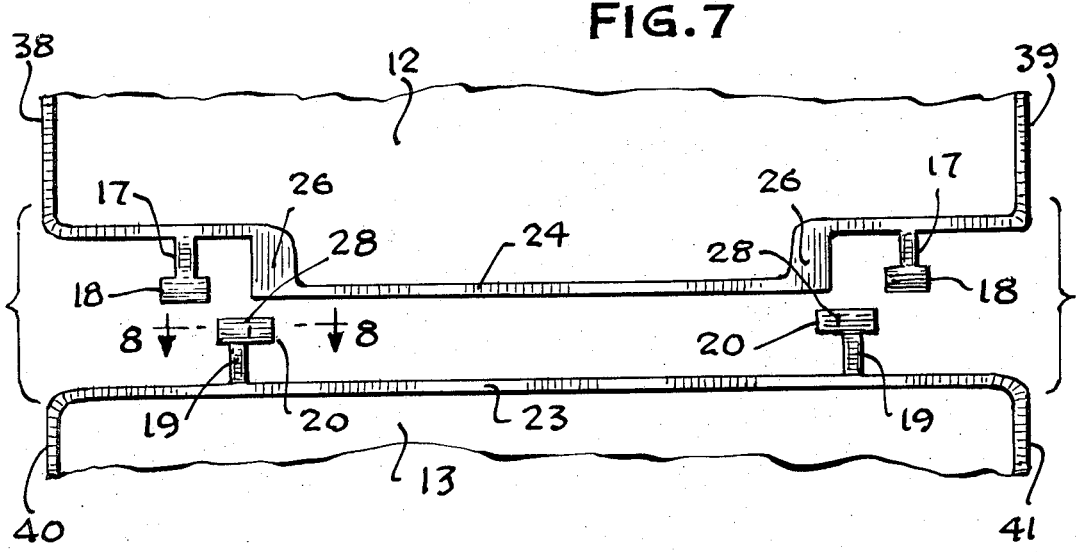

3,806,987

BARBECUE HINGE STRUCTURE

BACKGROUND OF THE INVENTION

This invention relates to a hinging means for a cover member and more particularly, to a hinge and stop structure which affords positive opening of the cover in an open position as well as retention of the cover on the base.

Hinges of the type concerned with in this invention are described in U. S. Pat. Nos. 948,491; 2,011,675 and 3,388,421. These prior hinges, while obviating the use of pintles, do not afford a stable and rigid holding between both a cover and a base member. Neither do they afford a retention of the cover when in a closed position yet allow removal when the cover is in an open position. The prior constructions also involve structures which are difficult to mold or require sliding while dropping of the cover. There is not presently available a hinge structure which affords double support between the cover and the base while at the same time retaining the cover in a captive manner when in a closed position. Neither is there available a hinge means for a portable grill which affords retention and removal of the cover without removal of parts.

It is therefore an object of the present invention to provide a hinge structure wherein the base supports the cover and the cover supports the base when the cover is in an open position. It is still another object of this invention to provide a novel double acting stop and support structure for a cover member which retains the cover on the base when the cover is closed. It is yet another object of the present invention to provide a novel hinge and stop structure for a portable barbecue grill which is easily fabricated and operated.

SUMMARY OF THE INVENTION

The foregoing objects are accomplished and the shortcomings of the prior art are overcome by the present hinge structure which is comprised of a bearing surface mounted on the rear wall of a base member for supporting engagement with a portion of the cover. A first stop member is supported from the rear wall of the base and positioned with the bearing surface between the stop and the rear wall to engage the rear wall surface of the cover. A second stop member is spaced and supported from the cover to engage the surface of the rear wall of the base. Both stop members are constructed and arranged to engage the respective surfaces when the cover is in an open position. The stop member on the base has an undercut surface to cooperate with a retaining surface on the cover to form a retaining feature. The cover has an external ledge for added engaging support by the stop member on the base. In a preferred manner the stop members are spaced from the wall surfaces by flanges.

BRIEF DESCRIPTION OF DRAWINGS

A better understanding of the present hinge structure will be accomplished by reference to the drawing wherein:

FIG. 1 is a view in elevation of the rear of a barbecue unit showing two of the novel hinge structures.

FIG. 2 is a view in side elevation of the hinge structure shown in FIG. 1 taken along line 2—2 of FIG. 1.

FIG. 3 is a partial perspective view of the rear of the barbecue unit shown in FIG. 1 and illustrating one of the hinge structures.

FIG. 4 is a partial top view with a portion of the cover removed to illustrate the hinge structure and the retention feature.

FIG. 5 is a view in partial vertical section showing the cover in an open position and supported by a base stop member.

FIG. 6 is a view similar to FIG. 5 but showing the cover stop member engaging the base.

FIG. 7 is a partial view of the base and cover showing the hinge structure with the cover and base positioned in a completely open and separated manner with the cover and base lying in the same horizontal plane.

FIG. 8 is a view in vertical section taken along line 8—8 of FIG. 7 and showing the undercut stop member which serves as part of the retention feature for the cover.

DESCRIPTION OF THE PREFERRED EMBODIMENT

Proceeding to a detailed description of the present invention, two oppositely disposed identical hinge and stop structures 10 are shown in FIG. 1 as for example, in conjunction with a portable, cast aluminum, gas-type, portable barbecue unit generally 11 composed of a cover member 12 and a base member 13, the unit being carried by handles 15 and 16 extending from the cover 12 and base 13, respectively. A flange 17 extends from cover 12 for supporting a rounded stop member 18 and a second flange 19 extends from base 13 for supporting a second rounded stop member 20, with both stop members 18 and 20 being spaced a distance from the rear walls 22 and 23.

As best shown in FIGS. 1, 3, 4 and 7, a vent member 24 which is integral with the rear wall 22 of cover 12 has a ledge type extension 26 extending laterally from it and outwardly from its lowermost point. It will be noted that stop member 20 is L-shaped in configuration and has an extension 28 to provide an under surface 30 for overriding ledge extension 26 which serves as a retention means for cover 12 except when it is substantially vertically disposed.

To aid in retaining cover 12 in an open position with the cover positioned slightly back over center, a ledge 32 is peripherally disposed on cover 12 with an outwardly projecting wall surface 33 for engagement with the rounded top 35 of stop member 20. This is best seen in FIG. 5.

As best illustrated in FIGS. 1 and 3, an esthetically attractive unit is afforded by having all of the engaging heads 35 and 36 for stop members 20 and 18, respectively, formed in a rounded manner and positioned in horizontal alignment when the cover 12 is closed. For stability purposes they are disposed on the rear walls 22 and 23 but near the side walls 38, 39 and 40, 41 of cover 12 and base 13, respectively.

A bearing support 37 is provided by the upper horizontal surface 34 of flanges 19. These bearing supports 37 are engaged by the adjacent portions of cover ledge 32 and affords a supporting surface as the cover 12 is pivoted over the base 13 at these points.

It will be noted that base 13 has peripheral inset portion 42 for engagement with a rack (not shown) for suporting the barbecue unit 11 above a supporting surface. Numerals 43 are the usual openings for air and a double gripping member 44 of the frictional type affords a temporary locking between upper and lower handles 15 and 16.

OPERATION

A better understanding of the advantages of the hinge structures 10 will be had by a description of their operation. When the barbecue unit is in a closed position, it will have the appearance as shown in FIGS. 1, 2 and 3 with cover 12 resting on base 13 and handles 15 and 16 held together in gripping member 44. In this position the unit is readily carried about and cover 12 is additionally retained on base 13 by lateral ledge extensions 26 being seated beneath the under surfaces 30 of stops 20. In the closed position stop members 20 on base 13 and stop members 18 on cover 12 are aligned in a horizontal manner. When it is desired to utilize the unit 11 for cooking purposes, handle 16 is disengaged from gripping member 44 and as cover 12 is lifted upwardly from the front, those portions of cover ledge 32 adjacent support bearing surfaces 37 will ride over and on these surfaces 37. As this motion proceeds, stop members 18 will move downwardly as will ledge extensions 26 and the opening of cover 12 will continue until stop members 18 engage the rear wall surface 23 of base 13 (FIG. 6). Stop members 20 are so constructed that when stops 18 so engage wall surface 23 of base 13, stop members 20 will engage the surface 33 on ledge 32 and the adjacent portion of cover 12 (FIG. 5). Stop members 18 and 20 are so designed that they make their previously described contact when the cover is slightly back over center from a plane normal to the base or more than 90 degrees. This position is shown in FIGS. 5 and 6. To remove cover 12 from base 13, cover 12 is moved to an approximate normal position with base to permit stop 18 to clear the ridge 45 on base 13 and in this position ledge extension 26 on cover 12 will pass between stops 20 and rear wall 23 (FIG. 7). To replace cover 12 on base 13, the previously described procedure is reversed.

Barbecue unit 11 with hinge structure 10 integrally molded thereon is molded from cast aluminum. Obviously, other metals such as iron and steel and alloys thereof can be employed. Neither is it necessary that stop members 18 and 20 and ledge 26 be integrally molded to the respective cover and base, 12 and 13. They can be formed as separate units and fastened to the respective supporting structures. Nor is the positioning of the hinge structures 10 on unit 11 critical. For stability purposes they are set near the side walls. This also affords more space for the vent 24. The size of stop members 18 and 20 in width as well as the extension of ledge 26 which has been found to work well is approximately one-half inch each. Stops 20 are set back from cover ledge about five-eighths inch. Cover ledge 32 extends approximately one-quarter inch out from cover 12 to form wall surface 33 and has a width of one-half inch. However, size is no critical factor.

It will thus be seen that there is now provided a novel hinge and stop structure which affords a high degree of stability for a barbecue unit. It has a retention feature for the cover yet permits removal without removal of parts. The hinge structure is simple in design and can be manufactured without expensive molding techniques. No adjustment or replacement of parts is required for the hinge arrangement as it is durable and has no moving parts. Further, it is especially adapted to a portable grill unit.

The foregoing invention can now be practiced by those skilled in the art. Such skilled persons will know that the invention is not necessarily restricted to the particular embodiment presented herein. The scope of the invention is to be defined by terms of the following claims as given meaning by the preceding description.

I claim:

1. A hinge and stop structure for a base member and a cover member providing positive holding of the cover when in an open position and removal of the cover when in an open position comprising a bearing surface mounted on the rear wall of said base member for supporting engagement with an edge portion of said cover when said cover is moved upwardly or downwardly over said base, a first stop member supported from the rear wall of said base and positioned with said bearing surface between said stop member and the rear wall of said base to engage the surface of the rear wall of said cover, and a second stop member spaced and supported from said cover to engage the surface of the rear wall of said base, both said stop members constructed and arranged to extend in opposing directions from said respective rear wall and cover when said cover is in a closed position on said base member and to engage opposing surfaces on said cover and base member when said cover is in an open position.

2. The hinge and stop structure as defined in claim 1 wherein two of said stop members are supported from both the base and the cover.

3. The hinge and stop structure as defined in claim 2 wherein said stop members on said base further include an under surface and oppositely disposed retaining sufaces are carried by said cover for positioning beneath said surface when said cover is in a closed position.

4. The hinge and stop structure as defined in claim 3 wherein said retaining surfaces are substantially flat ledges supported and extending from the lateral edges of a vent wall extending from said cover and said cover comprises the top of a barbecue grill.

5. The hinge and stop structure as defined in claim 1 wherein all of said stop members are supported from said cover and said base by outwardly extending flanges.

6. The hinge and stop structure as defined in claim 2 further including a ledge portion extending from the periphery of said cover and said stop member on said base is constructed with a rounded surface with said surface engaging both said ledge and a portion of said rear wall of said cover when said cover is in an open position.

7. The hinge and stop structure as defined in claim 6 wherein all of the stop members are provided with rounded surfaces for engagement with the respective ledge, rear and cover walls.

8. The hinge and stop structure as defined in claim 7 wherein said stop members are positioned to be in substantial horizontal alignment when said cover is closed on said base.

9. The hinge and stop structure as defined in claim 4 wherein said retaining surfaces extend from said vent and from the rear wall of said cover.

10. The hinge and stop structure as defined in claim 9 wherein all of said stop structures are positioned near the side walls on the rear walls of the respective cover and base.

* * * * *